(12) United States Patent
Shimomura et al.

(10) Patent No.: US 11,914,121 B2
(45) Date of Patent: Feb. 27, 2024

(54) REDUCTION OPTICAL SYSTEM AND IMAGE PICKUP APPARATUS

(71) Applicant: CANON KABUSHIKI KAISHA, Tokyo (JP)

(72) Inventors: Kazuya Shimomura, Saitama (JP); Akihiko Yuki, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 272 days.

(21) Appl. No.: 17/224,764

(22) Filed: Apr. 7, 2021

(65) Prior Publication Data

US 2021/0318526 A1    Oct. 14, 2021

(30) Foreign Application Priority Data

Apr. 13, 2020   (JP) ................. 2020-071688

(51) Int. Cl.
  *G02B 15/00*   (2006.01)
  *G02B 3/04*    (2006.01)
  *G02B 15/10*   (2006.01)
  *G02B 15/15*   (2006.01)

(52) U.S. Cl.
  CPC ............. *G02B 15/10* (2013.01); *G02B 3/04* (2013.01); *G02B 15/15* (2013.01)

(58) Field of Classification Search
  CPC ........ G02B 15/00; G02B 15/02; G02B 15/04; G02B 15/08–12
  See application file for complete search history.

(56) References Cited

U.S. PATENT DOCUMENTS

| | | | | |
|---|---|---|---|---|
| 4,634,235 A | * | 1/1987 | Fujioka | ............... G02B 15/10 359/755 |
| 6,373,638 B1 | * | 4/2002 | Kohno | ............... G02B 15/02 359/675 |
| 8,903,232 B1 | | 12/2014 | Caldwell | |
| 2006/0256451 A1 | | 11/2006 | Schaack | |
| 2006/0291843 A1 | | 12/2006 | Nose | |
| 2015/0346465 A1 | | 12/2015 | Yonezawa | |
| 2017/0277022 A1 | | 9/2017 | Ori | |

FOREIGN PATENT DOCUMENTS

| | | |
|---|---|---|
| CN | 101122673 A | 2/2008 |
| CN | 101276048 A | 10/2008 |
| CN | 106597647 A | 4/2017 |
| JP | S59029214 A | 2/1984 |
| JP | 2007003652 A | 1/2007 |
| JP | 6413211 B2 | 10/2018 |

* cited by examiner

*Primary Examiner* — Christopher Stanford
(74) *Attorney, Agent, or Firm* — CANON U.S.A., INC. IP Division

(57) ABSTRACT

A reduction optical system disposed on an image side of a main optical system, a composite focal length of the main optical system and the reduction optical system being shorter than a focal length of the main optical system, includes a first lens element disposed closest to an object side and having a positive refractive power, a second lens element disposed closest to an image side and having a positive refractive power, and a positive lens and a negative lens disposed between the first lens element and the second lens element.

14 Claims, 18 Drawing Sheets

REDUCTION OPTICAL SYSTEM AND IMAGE PICKUP APPARATUS

BACKGROUND OF THE INVENTION

Field of the Invention

The present invention relates to a reduction optical system and an image pickup apparatus.

Description of the Related Art

Japanese Patent No. 6413211 and U.S. Pat. No. 8,903,232 both discuss a reduction optical system disposed on an image side of a main optical system (interchangeable lens). A composite focal length of the main optical system and the reduction optical system is shorter than a focal length of the main optical system.

A small image pickup apparatus with an importance placed on mobility and operability is desired as an image pickup apparatus for movies and for still image pickup, and thus a small reduction optical system is also required. In addition, the reduction optical system having high optical performance while having sufficient back focus is also required. In the reduction optical system discussed in Japanese Patent No. 6413211, a negative lens having the strongest refractive power is disposed closest to an image side. Accordingly, a length of the back focus is insufficient. In the reduction optical system discussed in U.S. Pat. No. 8,903,232, a lens closest to an object side is a negative lens. As a result, a diameter of a lens on an image side of the negative lens is large.

SUMMARY OF THE INVENTION

An aspect of embodiments provides, for example, a reduction optical system beneficial in a small size, a sufficient back focus, and high optical performance thereof.

According to an aspect of embodiments, a reduction optical system disposed on an image side of a main optical system, a composite focal length of the main optical system and the reduction optical system being shorter than a focal length of the main optical system, includes a first lens element disposed closest to an object side and having a positive refractive power, a second lens element disposed closest to an image side and having a positive refractive power, and a positive lens and a negative lens disposed between the first lens element and the second lens element.

Further features of the present invention will become apparent from the following description of exemplary embodiments with reference to the attached drawings.

DESCRIPTION OF THE EMBODIMENTS

Figure 1:
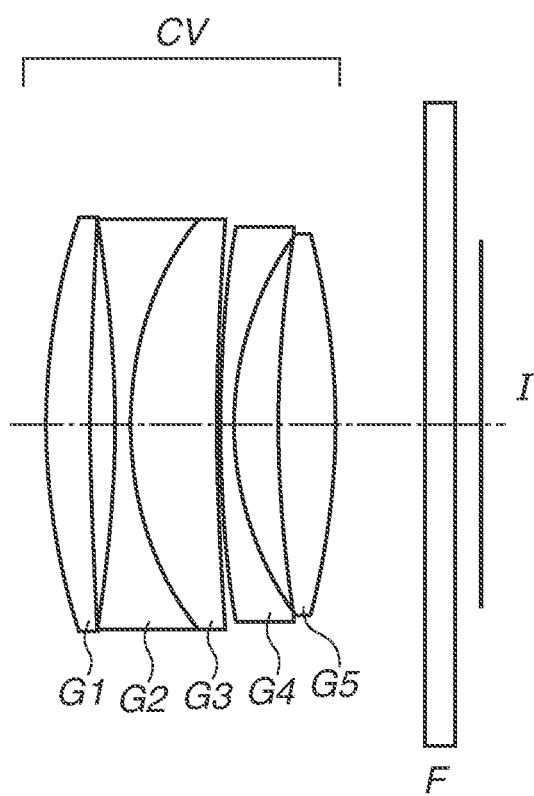
FIG. 1 is a cross-sectional view of a reduction optical system according to Example 1.

An exemplary embodiment of the present invention is described with reference to the accompanying drawings. In all of the diagrams illustrating the exemplary embodiment, the same members are denoted by the same reference numerals, and repetitive descriptions are omitted in principle (unless otherwise noted).

A reduction optical system (rear wide converter) according to the present exemplary embodiment is described. The reduction optical system is disposed on an image side of a main optical system (interchangeable lens). A composite focal length of the main optical system and the reduction optical system is shorter than a focal length of the main optical system. The reduction optical system is advantageous in terms of small size, sufficient back focus, and high optical performance. The reduction optical system includes a first lens element (single lens or cemented lens) that is disposed closest to an object side and has positive refractive power, and a second lens element (single lens or cemented lens) that is disposed closest to an image side and has positive refractive power. The reduction optical system further includes a positive lens (lens having positive refractive power) and a negative lens (lens having negative refractive power) between the first lens element and the second lens element. The positive lens is a single lens having positive refractive power or a lens having positive refractive power out of a cemented lens. The negative lens is a single lens having negative refractive power or a lens having negative refractive power out of a cemented lens.

The optical action of the above-described configuration is described. First, the first lens element that is disposed closest to the object side and has the positive refractive power is advantageous to reduce a diameter of each of lenses disposed on an image side of the first lens element. Further, a rear principle point of the reduction optical system can be disposed on the image side by the second lens element that is disposed closest to the image side and has the positive refractive power. Accordingly, it is advantageous to secure sufficient back focus. Moreover, the positive lens and the negative lens described above are provided between the first lens element and the second lens element, which is advantageous in terms of high optical performance. For example, it is possible to reduce chromatic aberration and astigmatism of the reduction optical system.

The reduction optical system preferably satisfies the following conditional expression, $$0.300 < fp1/f < 1.500, \quad (1)$$

where fp1 is a focal length of the first lens element, and f is a focal length of the reduction optical system. When the conditional expression (1) is satisfied, the refractive power of the first lens element becomes appropriate, and the reduction optical system advantageous in terms of small size and high optical performance can be realized. If the conditional expression (1) is not satisfied about an upper limit value, the refractive power of the first lens element becomes excessively weaker than the refractive power of the reduction optical system. Accordingly, the diameter of each of the lenses disposed on the image side of the first lens element becomes large, which is disadvantageous in terms of small size of the reduction optical system. If the conditional expression (1) is not satisfied about a lower limit value, the refractive power of the first lens element becomes excessively stronger than the refractive power of the reduction optical system. Accordingly, a curvature of each of the lenses configuring the reduction optical system becomes large, which is disadvantageous in terms of optical performance (spherical aberration, high-order aberration of curvature of field, etc.) of the reduction optical system.

The reduction optical system more preferably satisfies the following conditional expression, $$0.350 < fp1/f < 1.350. \quad (1a)$$

Further, the reduction optical system preferably satisfies the following conditional expression, $$0.500 < fp1/fp2 < 2.500, \quad (2)$$

where fp2 is a focal length of the second lens element. When the conditional expression (2) is satisfied, the refractive power of the first lens element and the refractive power of the second lens element become appropriate, which makes it possible to realize the reduction optical system advantageous in terms of sufficient back focus and small size. If the conditional expression (2) is not satisfied about an upper limit value, the refractive power of the first lens element becomes excessively weak. Thus, the diameter of each of the lenses disposed on the image side of the first lens element becomes large, which is disadvantageous in terms of small size of the reduction optical system. If the conditional expression (2) is not satisfied about a lower limit value, the refractive power of the second lens element becomes excessively weak. This makes it difficult to dispose the rear principle point of the reduction optical system on the image side, which is disadvantageous to secure sufficient back focus.

The reduction optical system more preferably satisfies the following conditional expression, $$0.600 < fp1/fp2 < 2.200. \quad (2a)$$

Further, the reduction optical system preferably includes at least one positive lens satisfying the following conditional expressions, $$1.895 < Nph, \quad (3)$$

$$0.200 < fph/f < 1.500, \quad (4)$$

where Nph is a refractive index of the positive lens configuring the reduction optical system, and fph is a focal length of the positive lens configuring the reduction optical system. When the conditional expressions (3) and (4) are satisfied, for example, curvature of field is effectively corrected, which makes it possible to realize the reduction optical system advantageous in terms of high optical performance. If the conditional expression (3) is not satisfied, the refractive power of the positive lens configuring the reduction optical system becomes excessively weaker than the reduction optical system having the positive refractive power. Thus, an absolute value of a Petzval sum is increased and the field of curvature becomes remarkable, which is disadvantageous to obtain high optical performance. If the conditional expression (4) is not satisfied about an upper limit value, the refractive power of the positive lens satisfying the conditional expression (3) becomes excessively weak. Thus, the absolute value of the Petzval sum is increased, which is disadvantageous to obtain high optical performance. If the conditional expression (4) is not satisfied about a lower limit value, the refractive power of the positive lens satisfying the expression (3) becomes excessively strong. Thus, the curvature of the lens configuring the reduction optical system is increased, which is disadvantageous in terms of optical performance (e.g., spherical aberration, high-order aberration of curvature of field) of the reduction optical system.

The reduction optical system more preferably satisfies the following conditional expressions, $$1.920 < Nph < 2.150, \quad (3a)$$

$$0.250 < fph/f < 1.350. \quad (4a)$$

Further, the reduction optical system satisfies the following conditional expression, $$-0.700 < fn/f < -0.100, \quad (5)$$

where the first lens element is a single lens, and fn is a focal length of the negative lens disposed closest to the object side. When the conditional expression (5) is satisfied, the reduction optical system that is advantageous in terms of sufficient back focus and high optical performance can be realized. If the conditional expression (5) is not satisfied about an upper limit value, the refractive power of the negative lens becomes excessively stronger than the refractive power of the reduction optical system. Thus, the curvature of the negative lens is increased, which is disadvantageous in terms of optical performance (e.g., spherical aberration, high-order aberration of curvature of field) of the reduction optical system. If the conditional expression (5) is not satisfied about a lower limit value, the refractive power of the negative lens becomes excessively weaker than the refractive power of the reduction optical system, which is disadvantageous to secure sufficient back focus.

The reduction optical system more preferably satisfies the following conditional expression, $$-0.600 < fn/f < -0.200. \quad (5a)$$

Further, the reduction optical system preferably satisfies the following conditional expression, $$-1.500 < f/r1 < -0.200, \quad (6)$$

where r1 is a radius of curvature on the object side of the negative lens disposed closest to the object side. When the conditional expression (6) is satisfied, the object-side surface of the negative lens is a concave surface. This makes it possible to realize the reduction optical system advantageous in terms of high optical performance. If the conditional expression (6) is not satisfied about an upper limit value, the radius of curvature of the object-side surface of the negative lens becomes excessively large. Thus, the correction effect of the spherical aberration is lowered, which is disadvantageous in terms of high optical performance. If the conditional expression (6) is not satisfied about a lower limit value, the curvature of radius on the object-side surface of the negative lens becomes excessively small. Thus, high-order spherical aberration occurs, which is disadvantageous in terms of high optical performance.

The reduction optical system more preferably satisfies the following conditional expression, $$-1.300 < f/r1 < -0.300. \quad (6a)$$

Further, in the reduction optical system, the lens disposed closest to the image side out of the second lens element is preferably a positive lens. The rear principle point of the reduction optical system can be disposed sufficiently on the image side by the positive lens. This is advantageous to obtain sufficient back focus.

Further, the reduction optical system satisfies the following conditional expression, $$0.500 < \beta < 0.900, \quad (7)$$

where $\beta$ is a lateral magnification of the reduction optical system disposed on the image side of the main optical system. If the conditional expression (7) is not satisfied about an upper limit value, the action to make the obtained focal length shorter than the focal length of the main optical system is excessively lowered. If the conditional expression (7) is not satisfied about a lower limit value, the action to make the obtained focal length shorter than the focal length of the main optical system is increased, but the refractive power of the reduction optical system becomes excessively strong, which is disadvantageous in terms of high optical performance.

The reduction optical system more preferably satisfies the following conditional expression, $$0.600 < \beta < 0.850. \quad (7a)$$

Further, according to the present exemplary embodiment, it is possible to configure an image pickup apparatus including the above-described reduction optical system and an image pickup element that picks up an image formed via the reduction optical system. Alternatively, it is possible to configure an image pickup apparatus that includes an image pickup apparatus main body including the above-described reduction optical system. Therefore, according to the present exemplary embodiment, it is possible to realize the image pickup apparatus having the above-described advantages of the reduction optical system.

Examples 1 to 7 according to the present exemplary embodiment are described.

Example 1

Figure 15:
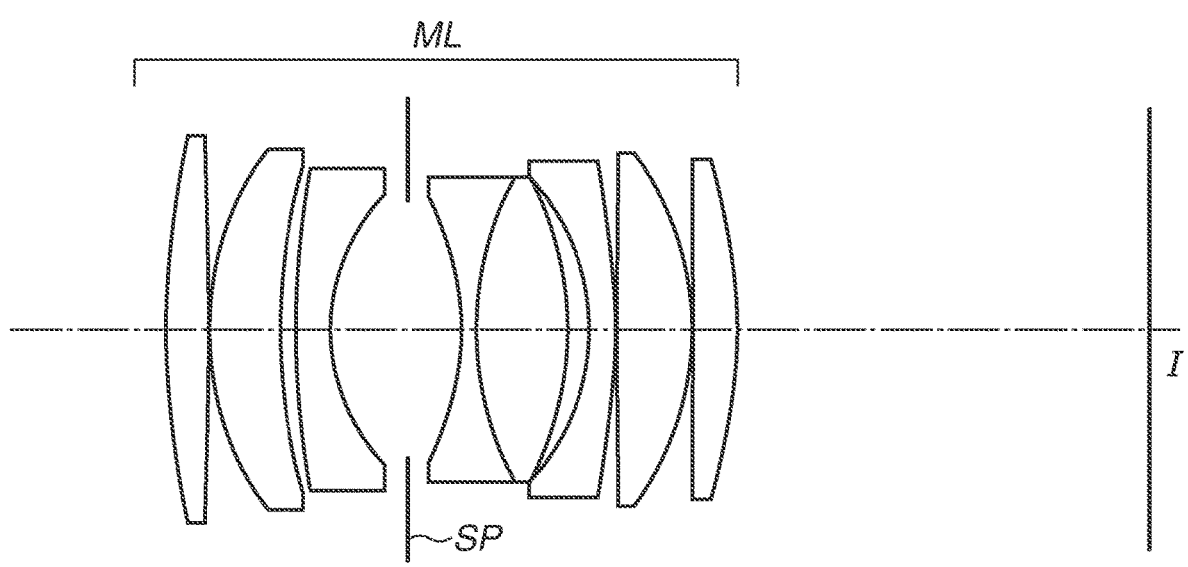
FIG. 15 is a cross-sectional view of the main optical system focusing on infinity.
Figure 16:
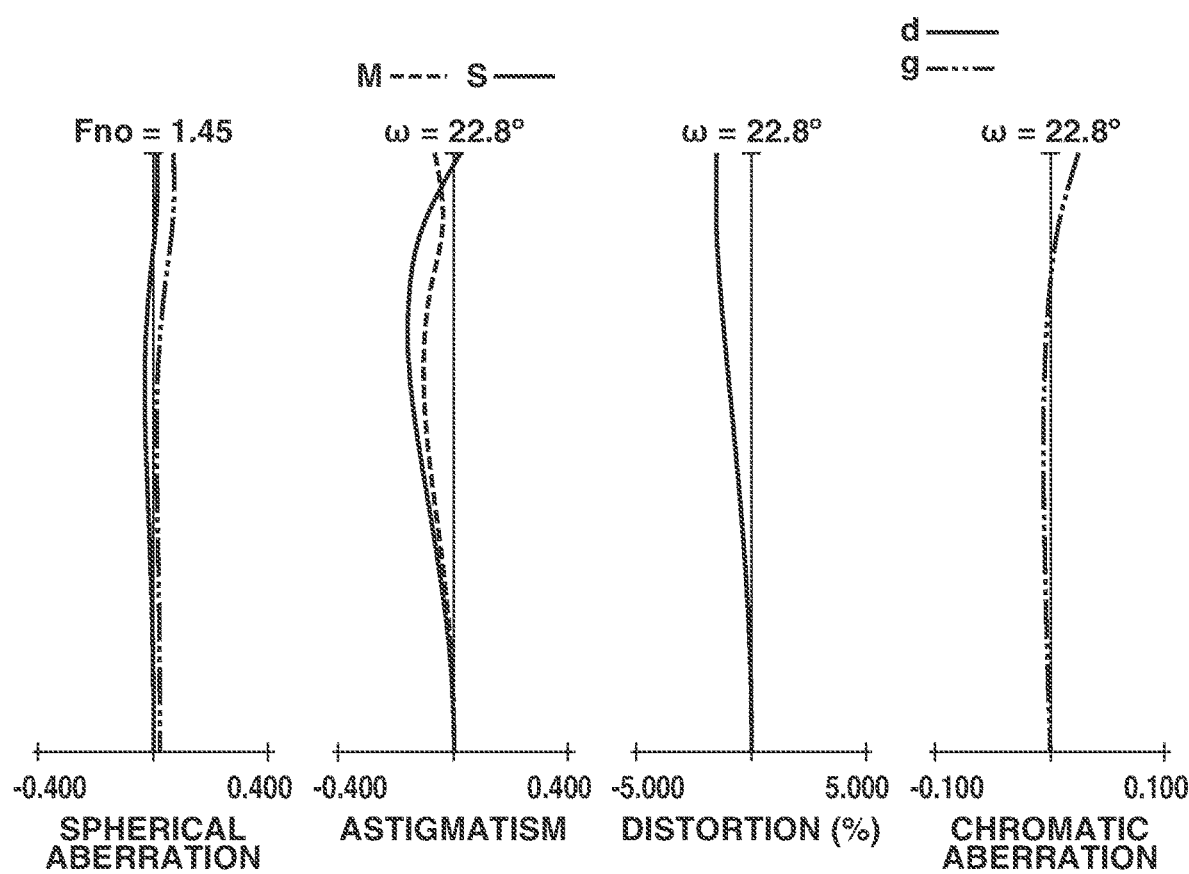
FIG. 16 is a diagram illustrating longitudinal aberrations of the main optical system focusing on infinity.

FIG. 1 is a cross-sectional view of a reduction optical system according to Example 1 (corresponding to Numerical Example 1). FIG. 15 is a cross-sectional view of a main optical system that focuses on infinity and is attached to a reduction optical system of each of Examples. FIG. 16 is a diagram illustrating longitudinal aberrations of the main optical system focusing on infinity. Unless otherwise noted, a unit of a length is mm also in Numerical Examples described below.

In FIG. 1, CV indicates the reduction optical system, and F indicates a glass block such as a filter. In FIG. 15, ML indicates the main optical system, and SP indicates an aperture stop. In FIG. 1 and FIG. 15, I indicates an image plane, and an image pickup surface of the image pickup element may be disposed on the image plane I. In the diagram illustrating the longitudinal aberrations, a straight line and an alternate long and two short dashes line in spherical aberration respectively correspond to a d-line and a g-line. A dashed line and a solid line in astigmatism respectively correspond to a meridional image plane and a sagittal image plane. An alternate long and two short dashes line in magnification chromatic aberration corresponds to the g-line. Further, ω indicates a half field angle, and Fno indicates an F-number. A full scale of a lateral axis in the diagram illustrating the longitudinal aberrations is set to ±0.400 mm in spherical aberration, ±0.400 mm in astigmatism, ±5.000% in distortion, and ±0.100 mm in magnification chromatic aberration. In addition, the main optical system corresponds to 35 mm full-size as an image size, and an image circle thereof has a diameter of 43.3 mm.

Figure 2:
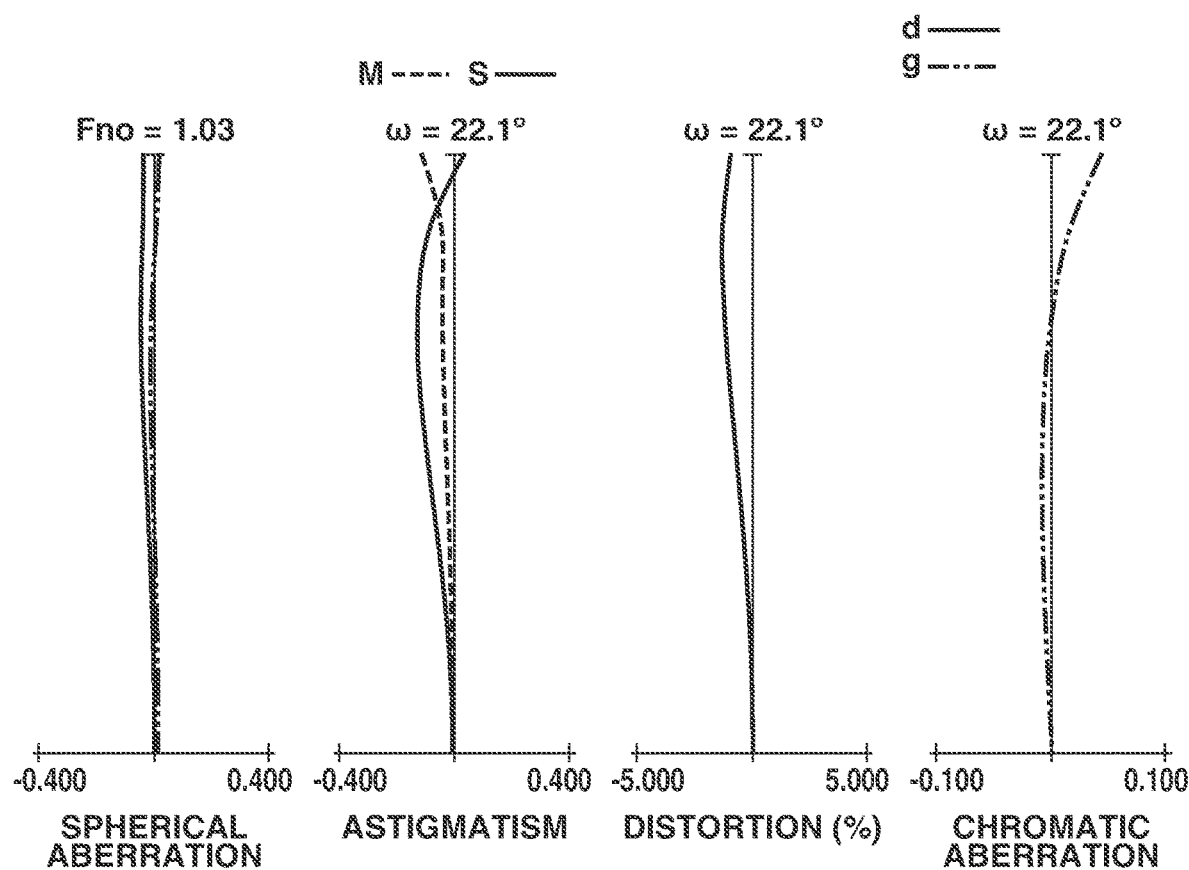
FIG. 2 is a diagram illustrating longitudinal aberrations of an optical system in which the reduction optical system according to Example 1 is attached to a main optical system focusing on infinity.

FIG. 2 is a diagram illustrating longitudinal aberrations of an optical system in which the reduction optical system according to Example 1 is attached to the main optical system focusing on infinity. The surface closest to the object side of the reduction optical system according to the present example is disposed at a position separated toward the image side by 2.638 mm from a 16th surface that is the surface closest to the image side in the main optical system. The reduction optical system according to the present example consists of, in order from the object side, a meniscus convex lens G1 concave on the image side, a cemented lens obtained by cementing a biconcave lens G2 and a meniscus convex lens G3 concave on the image side, a meniscus concave lens G4 convex on the object side, and a biconvex lens G5. In the present example, the first lens element is the meniscus convex lens G1, the second lens element is the biconvex lens G5, and the negative lens disposed closest to the object side is the biconcave lens G2. By attaching the reduction optical system according to the present example to the main optical system, an image circle having a diameter that is obtained by multiplying the diameter of the image circle of the main optical system 0.710 times is obtained. Lenses G1, G3, and G5 are positive refractive power lenses. Lenses G2 and G4 are negative refractive power lenses Details of numerical values according to each of numerical examples are described below. In each of the numerical examples, r is a radius of curvature of each surface, d is a distance between surfaces, nd or Nd is an absolute refractive index with respect to a d-line of a Fraunhofer line at 1 atmospheric pressure, νd is an Abbe number, and BF is back focus (air conversion length). The definition of the Abbe number νd is similar to the definition commonly used, that is, the Abbe number νd is represented as follows, $$\nu d = (Nd - 1)/(NF - NC),$$

where Ng, NF, Nd, and NC are respectively refractive indices with respect to a g-line, an F-line, a D-line, and a C-line of a Fraunhofer line.

An aspherical surface shape is represented while an X-axis extends in an optical axis direction, an H-axis extends in a direction orthogonal to the optical axis direction, and a light traveling direction is positive. The aspherical surface shape (deviation amount from reference spherical surface) is represented by the following expression, $$X = \frac{H^2/R}{1 + \sqrt{1 - (1+k)(H/R)^2}} +$$ [Expression 1]

$$A4H^4 + A6H^6 + A8H^8 + A10H^{10} + A12H^{12}$$

where R is a paraxial radius of curvature, k is a conic constant, and A4, A6, A8, A10, and A12 are aspherical surface coefficients. In addition, "e-Z" means "×10-Z".

Table 1 illustrates values related to the conditional expressions (1) to (7) according to the present example. The present example can provide a reduction optical system that satisfies all of the conditional expressions (1) to (7) and is advantageous in terms of small size, sufficient back focus, and high optical performance. It is sufficient for the reduction optical system according to the present example to have a configuration according to claim 1 described below, and the conditional expressions (1) to (7) may not be necessarily satisfied. In a case where at least one of the conditional expressions (1) to (7) is satisfied, it is possible to exert more remarkable effects as compared with a case where no conditional expression is satisfied.

Figure 17:
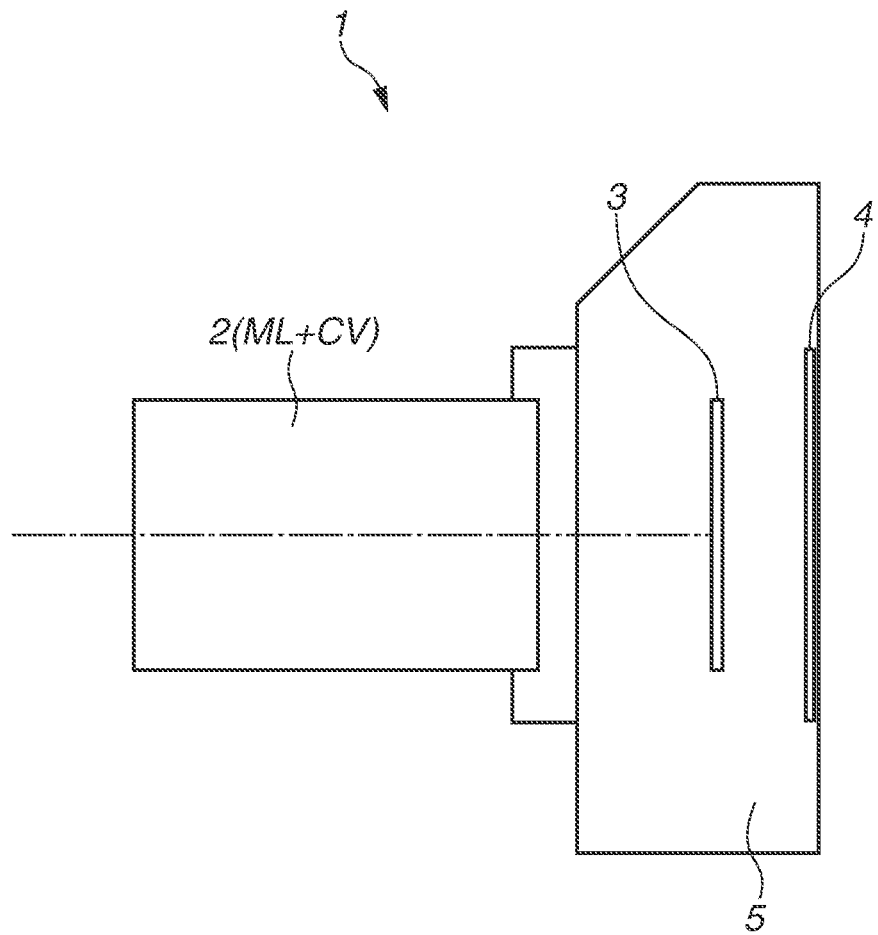
FIG. 17 is a diagram illustrating a configuration example of an image pickup apparatus.
Figure 18:
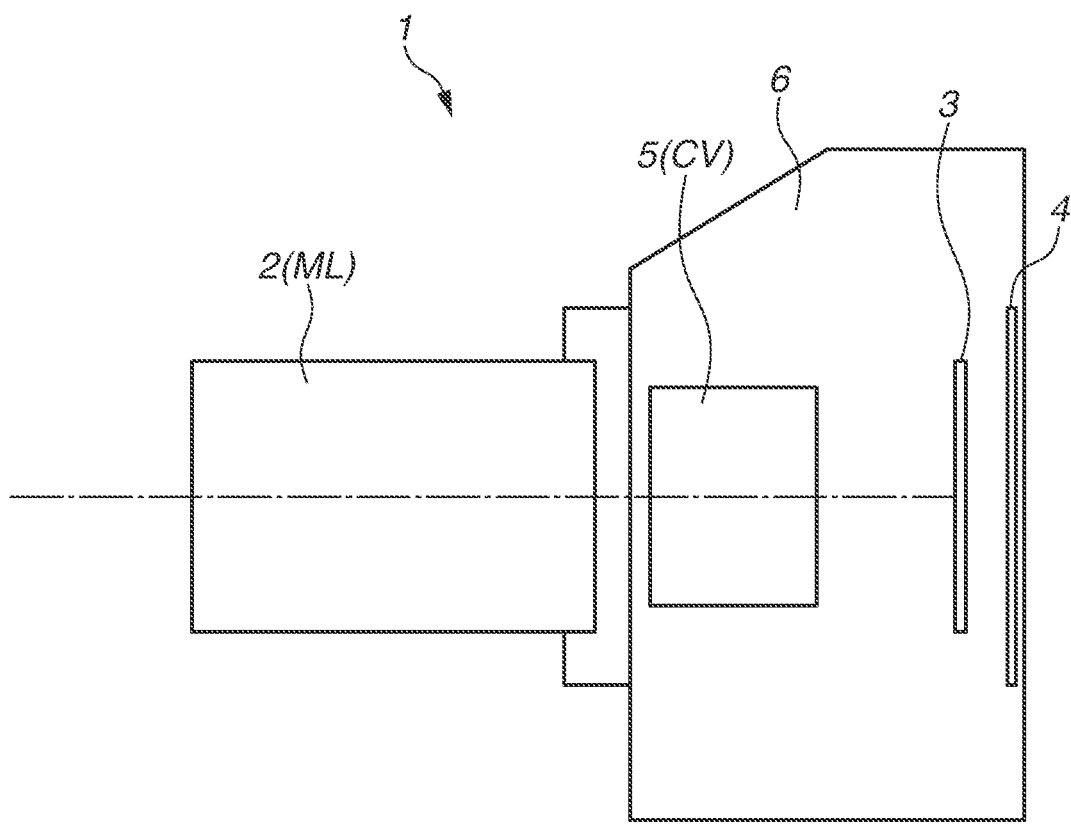
FIG. 18 is a diagram illustrating another configuration example of the image pickup apparatus.

An image pickup apparatus including the reduction optical system CV according to the present example is described. FIG. 17 is a diagram illustrating a configuration example of the image pickup apparatus. In FIG. 17, an image pickup apparatus 1 may be, for example, a so-called lens interchangeable image pickup apparatus including an optical system 2 that includes the main optical system ML and the reduction optical system CV. The image pickup apparatus may be a so-called mirrorless camera. The optical system 2 has a configuration in which the reduction optical system CV is attached on the image side of the main optical system ML. In the image pickup apparatus 1, the optical system 2 forms, by light from an object (not illustrated), an image (object image) on an image pickup surface of an image pickup element 3 disposed inside an image pickup apparatus main body 5, through an optical low-pass filter (not illustrated). The image pickup element 3 picks up (performs photoelectric conversion of) the image to generate image data. The image data is displayed on a display unit 4 (image display unit such as electronic viewfinder) included in the image pickup apparatus 1 (image pickup apparatus main body 5). A user of the image pickup apparatus 1 can observe the object through the display unit 4. When an image pickup starting member (e.g., release button) is operated by the user, the image data obtained through the image pickup element 3 is stored in, for example, a storage unit (memory) mounted in the image pickup apparatus main body 5. The user can capture the image of the object by the image pickup apparatus 1 in the above-described manner FIG. 18 is a diagram illustrating another configuration example of the image pickup apparatus. In FIG. 18, the image pickup apparatus 1 includes an image pickup apparatus main body 6 that includes a reduction optical system 5 (CV). Other parts of the configuration of the image pickup apparatus main body 6 is similar to the configuration in FIG. 17. A main optical system 2 (ML) is attached to the image pickup apparatus main body 6 without through a reduction optical system 5 (CV). According to the present example, it is possible to provide the image pickup apparatus 1 including the reduction optical system CV advantageous in terms of small size, sufficient back focus, and high optical performance. The image pickup apparatus according to the present example is not limited to the so-called mirrorless camera, and may be a single-lens reflex camera that includes a quick-return mirror in the image pickup apparatus main body 5 and enables observation of the object image through an optical finder system. Further, the image pickup apparatus according to the present example may be used as a camera for videos, for movies, and for broadcasting. As described above, according to the present example, it is possible to provide the reduction optical system advantageous in terms of, for example, small size, sufficient back focus, and high optical performance.

Example 2

Figure 3:
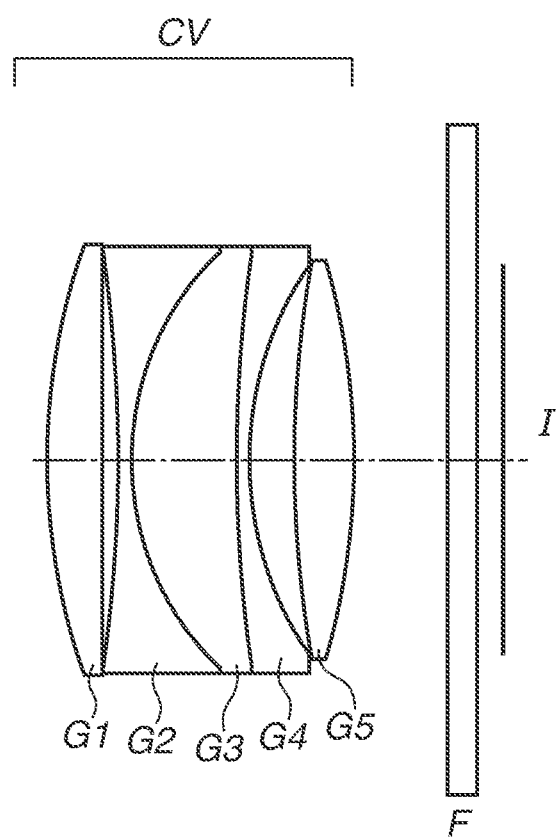
FIG. 3 is a cross-sectional view of a reduction optical system according to Example 2.
Figure 4:
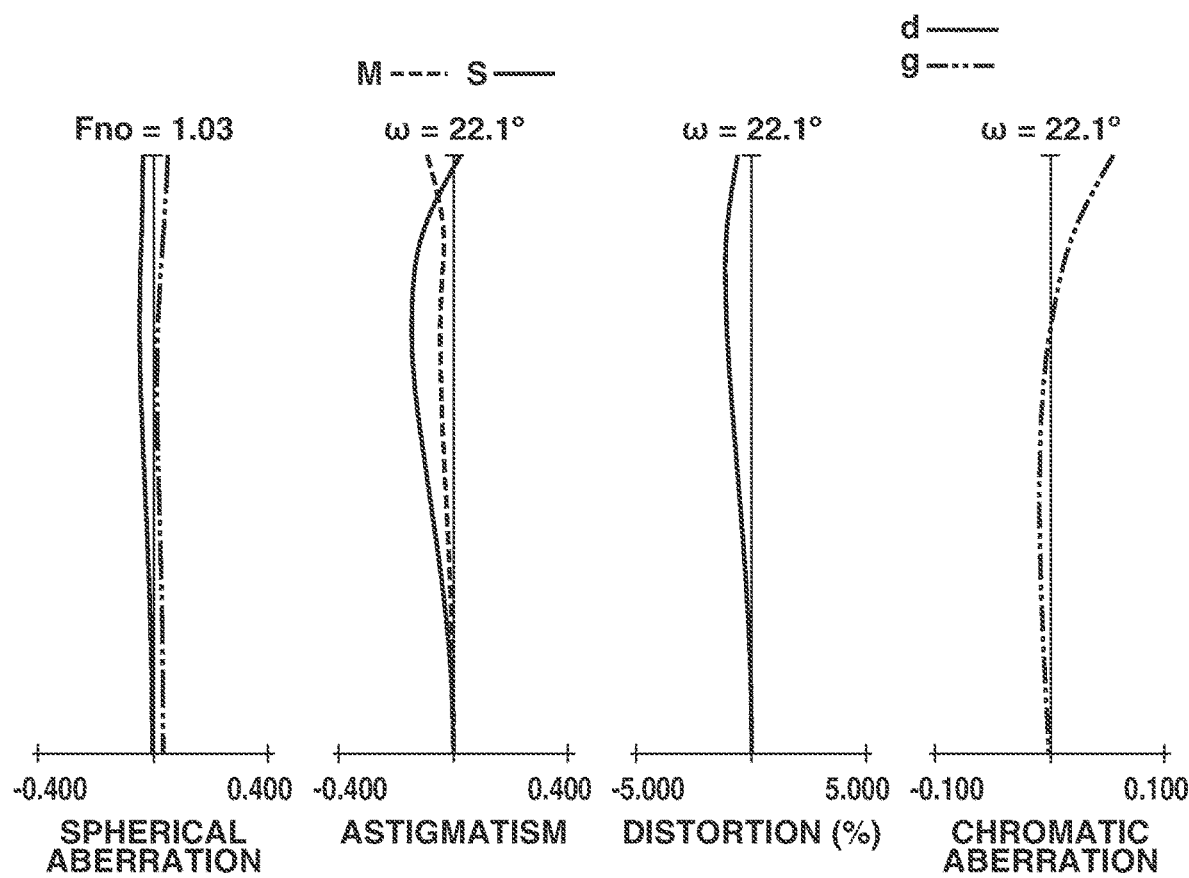
FIG. 4 is a diagram illustrating longitudinal aberrations of an optical system in which the reduction optical system according to Example 2 is attached to the main optical system focusing on infinity.

FIG. 3 is a cross-sectional view of a reduction optical system according to Example 2 (corresponding to Numerical Example 2). FIG. 4 is a diagram illustrating longitudinal aberrations of an optical system in which the reduction optical system according to Example 2 is attached to the main optical system focusing on infinity. The surface closest to the object side of the reduction optical system according to the present example is disposed at a position separated toward the image side by 2.640 mm from a 16th surface that is the surface closest to the image side in the main optical system. The reduction optical system according to the present example consists of, in order from the object side, a meniscus convex lens G1 concave on the image side, a cemented lens obtained by cementing a biconcave lens G2, a meniscus convex lens G3 concave on the image side, and a meniscus concave lens G4 convex on the object side, and a biconvex lens G5. In the present example, the first lens element is the meniscus convex lens G1, the second lens element is the biconvex lens G5, and the negative lens disposed closest to the object side is the biconcave lens G2. By attaching the reduction optical system according to the present example to the main optical system, an image circle having a diameter that is obtained by multiplying the diameter of the image circle of the main optical system 0.710 times is obtained. Lenses G1, G3, and G5 are positive refractive power lenses. Lenses G2 and G4 are negative refractive power lenses.

Table 1 illustrates values related to the conditional expressions (1) to (7) according to the present example. The present example can provide a reduction optical system that satisfies all of the conditional expressions (1) to (7) and is advantageous in terms of small size, sufficient back focus, and high optical performance. It is sufficient for the reduction optical system according to the present example to have a configuration according to claim 1 described below, and the conditional expressions (1) to (7) may not be necessarily satisfied. In a case where at least one of the conditional expressions (1) to (7) is satisfied, it is possible to exert more remarkable effects as compared with a case where no conditional expression is satisfied.

Example 3

Figure 5:
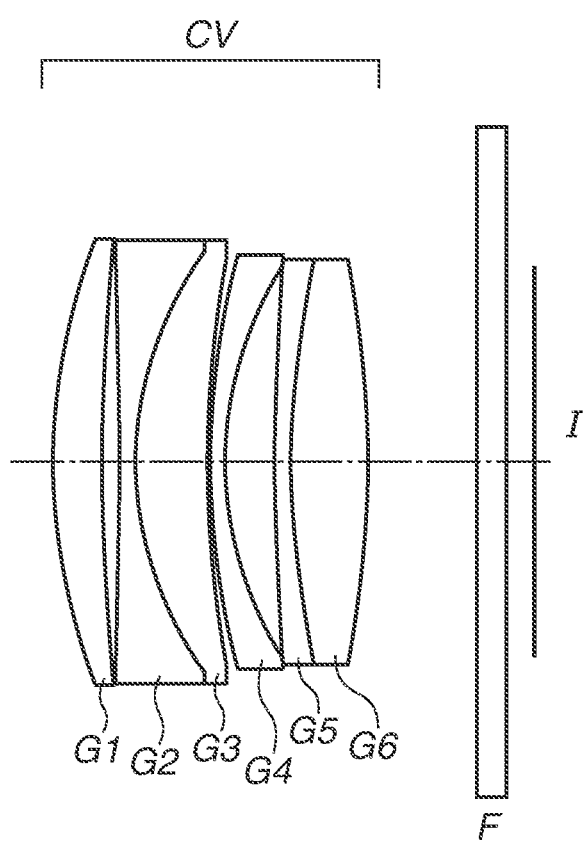
FIG. 5 is a cross-sectional view of a reduction optical system according to Example 3.
Figure 6:
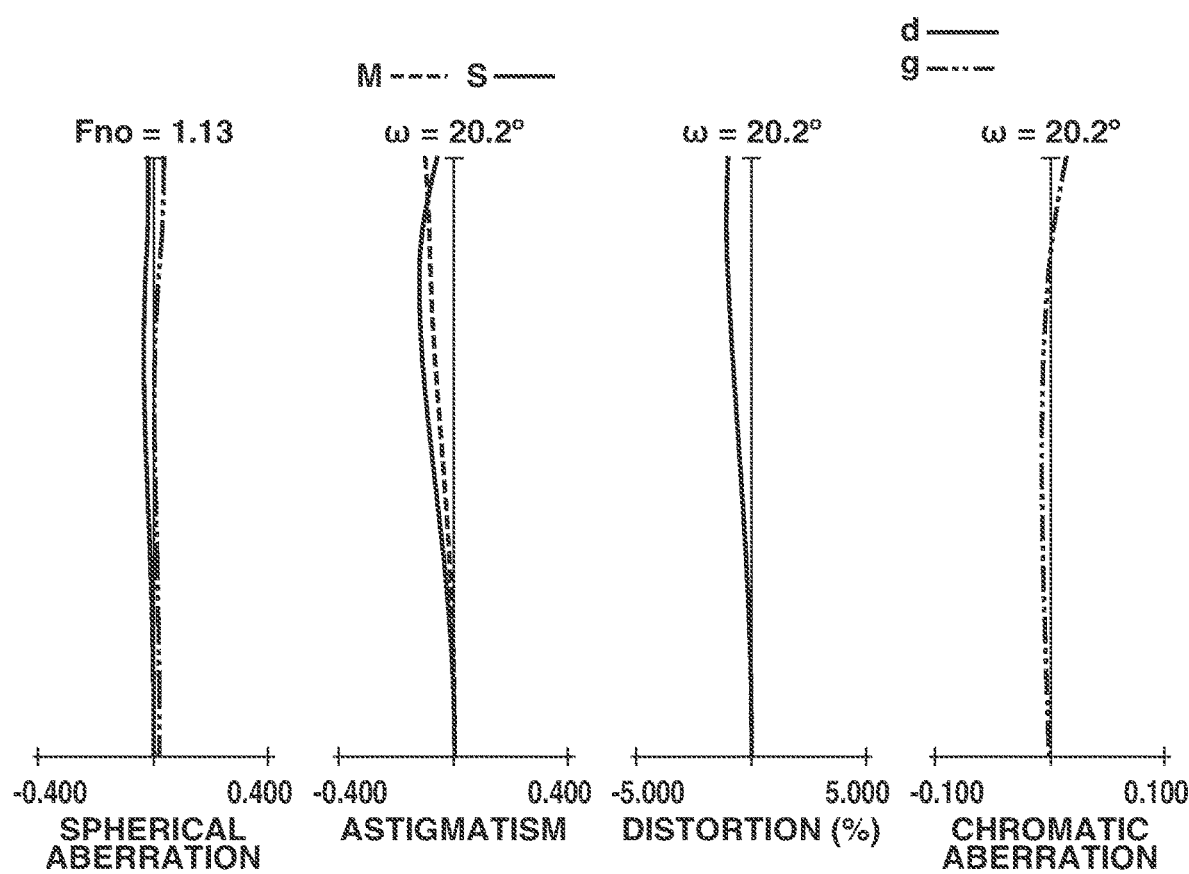
FIG. 6 is a diagram illustrating longitudinal aberrations of an optical system in which the reduction optical system according to Example 3 is attached to the main optical system focusing on infinity.

FIG. 5 is a cross-sectional view of a reduction optical system according to Example 3 (corresponding to Numerical Example 3). FIG. 6 is a diagram illustrating longitudinal aberrations of an optical system in which the reduction optical system according to Example 3 is attached to the main optical system focusing on infinity. The surface closest to the object side of the reduction optical system according to the present example is disposed at a position separated toward the image side by 2.640 mm from a 16th surface that is the surface closest to the image side in the main optical system. The reduction optical system according to the present example consists of, in order from the object side, a meniscus convex lens G1 concave on the image side, a cemented lens obtained by cementing a biconcave lens G2 and a meniscus convex lens G3 concave on the image side, a meniscus concave lens G4 convex on the object side, and a cemented lens obtained by cementing a meniscus concave lens G5 convex on the object side and a biconvex lens G6. In the present example, the first lens element is the meniscus convex lens G1, the second lens element is the cemented lens obtained by cementing the meniscus concave lens G5 and the biconvex lens G6, and the negative lens disposed closest to the object side is the biconcave lens G2. By attaching the reduction optical system according to the present example to the main optical system, an image circle having a diameter that is obtained by multiplying the diameter of the image circle of the main optical system 0.780 times is obtained. Lenses G1, G3, and G6 are positive refractive power lenses. Lenses G2, G4, and G5 are negative refractive power lenses. The second lens element obtained by cementing the meniscus concave lens G5 and the biconvex lens G6 has a positive refractive power.

Table 1 illustrates values related to the conditional expressions (1) to (7) according to the present example. The present example can provide a reduction optical system that satisfies all of the conditional expressions (1) to (7) and is advantageous in terms of small size, sufficient back focus, and high optical performance. It is sufficient for the reduction optical system according to the present example to have a configuration according to claim 1 described below, and the conditional expressions (1) to (7) may not be necessarily satisfied. In a case where at least one of the conditional expressions (1) to (7) is satisfied, it is possible to exert more remarkable effects as compared with a case where no conditional expression is satisfied.

Example 4

Figure 7:
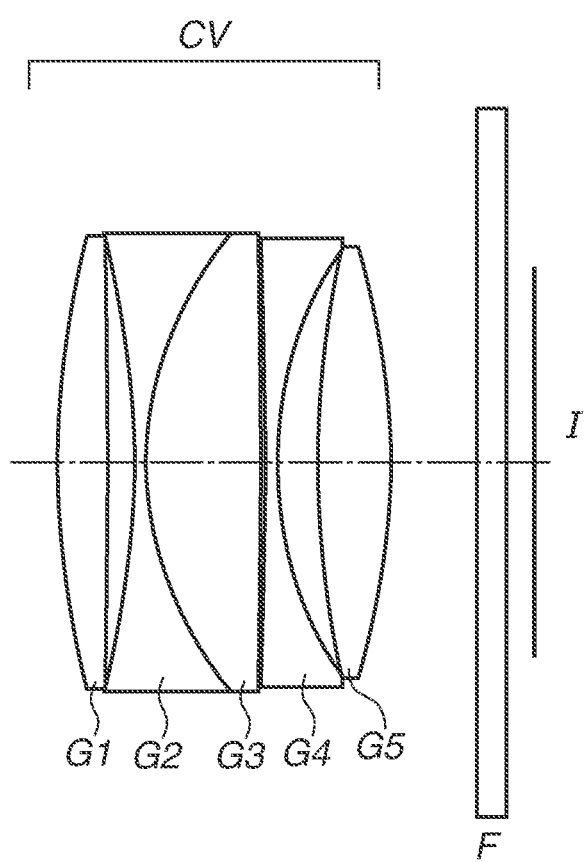
FIG. 7 is a cross-sectional view of a reduction optical system according to Example 4.
Figure 8:
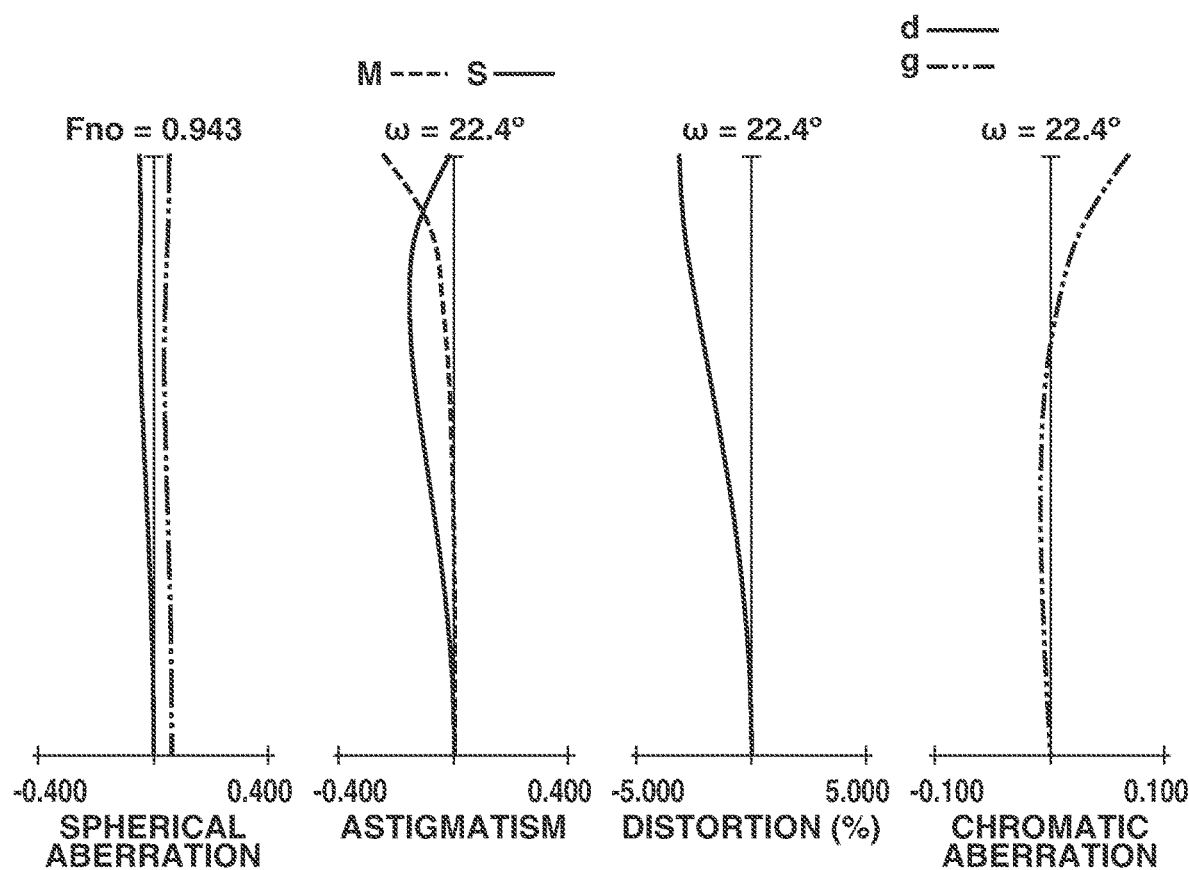
FIG. 8 is a diagram illustrating longitudinal aberrations of an optical system in which the reduction optical system according to Example 4 is attached to the main optical system focusing on infinity.

FIG. 7 is a cross-sectional view of a reduction optical system according to Example 4 (corresponding to Numerical Example 4). FIG. 8 is a diagram illustrating longitudinal aberrations of an optical system in which the reduction optical system according to Example 4 is attached to the main optical system focusing on infinity. The surface closest to the object side of the reduction optical system according to the present example is disposed at a position separated toward the image side by 2.636 mm from a 16th surface that is the surface closest to the image side in the main optical system. The reduction optical system according to the present example consists of, in order from the object side, a biconvex lens G1, a cemented lens obtained by cementing a biconcave lens G2 and a biconvex lens G3, a biconcave lens G4, and a biconvex lens G5. In the present example, the first lens element is the biconvex lens G1, the second lens element is the biconvex lens G5, and the negative lens disposed closest to the object side is the biconcave lens G2. By attaching the reduction optical system according to the present example to the main optical system, an image circle having a diameter that is obtained by multiplying the diameter of the image circle of the main optical system 0.650 times is obtained. Lenses G1, G3, and G5 are positive refractive power lenses. Lenses G2 and G4 are negative refractive power lenses.

Table 1 illustrates values related to the conditional expressions (1) to (7) according to the present example. The present example can provide a reduction optical system that satisfies all of the conditional expressions (1) to (7) and is advantageous in terms of small size, sufficient back focus, and high optical performance. It is sufficient for the reduction optical system according to the present example to have a configuration according to claim 1 described below, and the conditional expressions (1) to (7) may not be necessarily satisfied. In a case where at least one of the conditional expressions (1) to (7) is satisfied, it is possible to exert more remarkable effects as compared with a case where no conditional expression is satisfied.

Example 5

Figure 9:
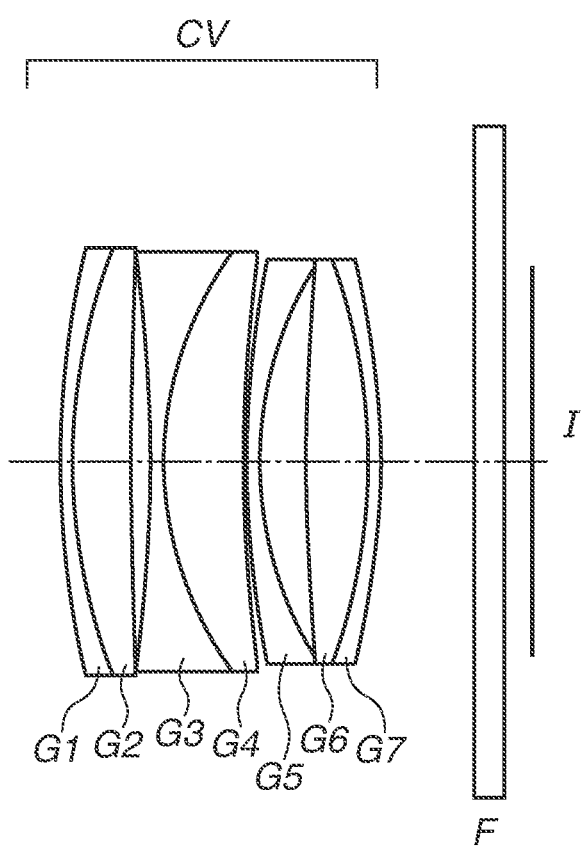
FIG. 9 is a cross-sectional view of a reduction optical system according to Example 5.
Figure 10:
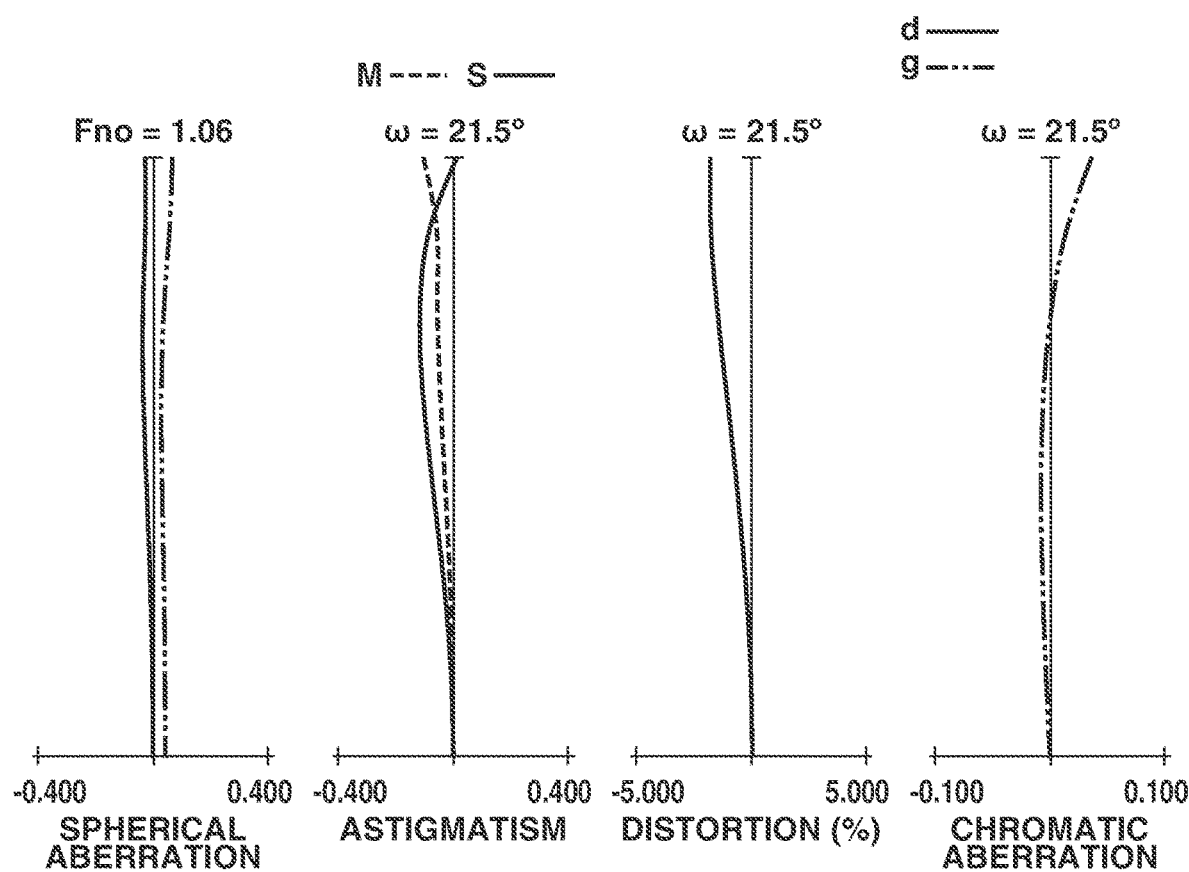
FIG. 10 is a diagram illustrating longitudinal aberrations of an optical system in which the reduction optical system according to Example 5 is attached to the main optical system focusing on infinity.

FIG. 9 is a cross-sectional view of a reduction optical system according to Example 5 (corresponding to Numerical Example 5). FIG. 10 is a diagram illustrating longitudinal aberrations of an optical system in which the reduction optical system according to Example 5 is attached to the main optical system focusing on infinity. The surface closest to the object side of the reduction optical system according to the present example is disposed at a position separated toward the image side by 2.640 mm from a 16th surface that is the surface closest to the image side in the main optical system. The reduction optical system according to the present example includes, in order from the object side, a cemented lens obtained by cementing a meniscus concave lens G1 convex on the object side and a meniscus convex lens G2 concave on the image side, and a cemented lens obtained by cementing a biconcave lens G3 and a meniscus convex lens G4 concave on the image side. The reduction optical system according to the present example further includes a meniscus concave lens G5 convex on the object side, and a cemented lens obtained by cementing a biconvex lens G6 and a meniscus concave lens G7 convex on the image side. In the present example, the first lens element is the cemented lens obtained by cementing the meniscus concave lens G1 and the meniscus convex lens G2, and the second lens element is the cemented lens obtained by cementing the biconvex lens G6 and the meniscus concave lens G7. By attaching the reduction optical system according to the present example to the main optical system, an image circle having a diameter that is obtained by multiplying the diameter of the image circle of the main optical system 0.730 times is obtained. Lenses G2, G4 and G6 are positive refractive power lenses. Lenses G1, G3, G5, and G7 are negative refractive power lenses. The first lens element obtained by cementing the meniscus concave lens G1 and the meniscus convex lens G2, and the second lens element obtained by cementing the biconvex lens G6 and the meniscus concave lens G7, have positive refractive powers.

Table 1 illustrates values related to the conditional expressions (1) to (7) according to the present example. The present example can provide a reduction optical system that satisfies all of the conditional expressions (1) to (7) and is advantageous in terms of small size, sufficient back focus, and high optical performance. It is sufficient for the reduction optical system according to the present example to have a configuration according to claim 1 described below, and the conditional expressions (1) to (7) may not be necessarily satisfied. In a case where at least one of the conditional expressions (1) to (7) is satisfied, it is possible to exert more remarkable effects as compared with a case where no conditional expression is satisfied.

Example 6

Figure 11:
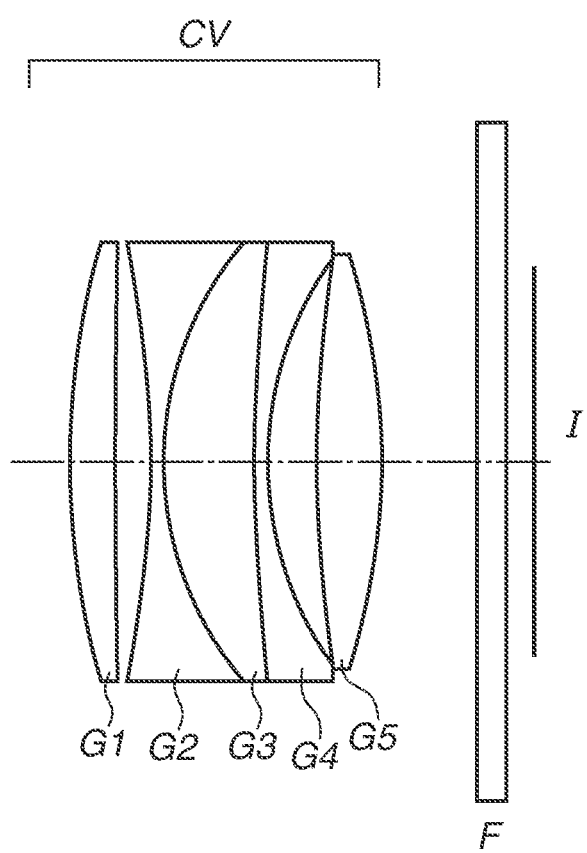
FIG. 11 is a cross-sectional view of a reduction optical system according to Example 6.
Figure 12:
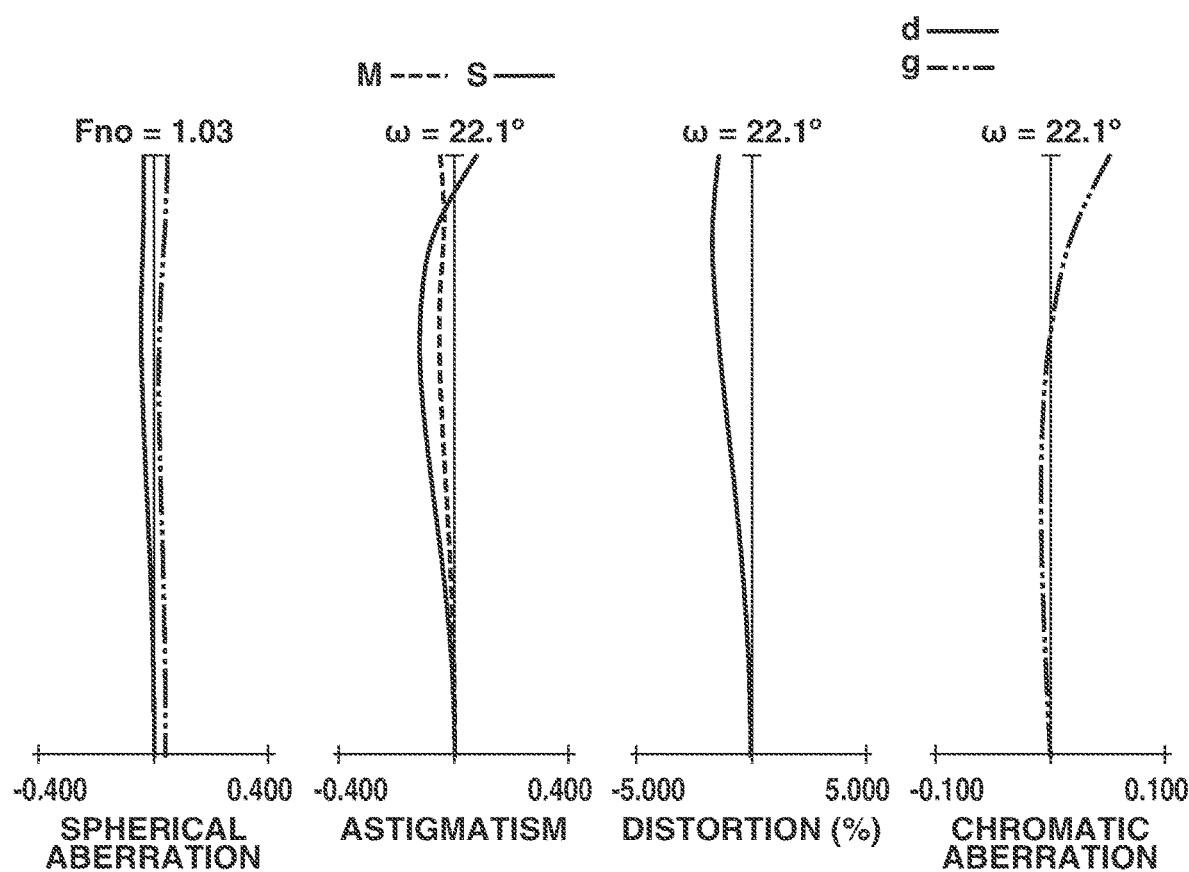
FIG. 12 is a diagram illustrating longitudinal aberrations of an optical system in which the reduction optical system according to Example 6 is attached to the main optical system focusing on infinity.

FIG. 11 is a cross-sectional view of a reduction optical system according to Example 6 (corresponding to Numerical Example 6). FIG. 12 is a diagram illustrating longitudinal aberrations of an optical system in which the reduction optical system according to Example 6 is attached to the main optical system focusing on infinity. The surface closest to the object side of the reduction optical system according to the present example is disposed at a position separated toward the image side by 2.640 mm from a 16th surface that is the surface closest to the image side in the main optical system. The reduction optical system according to the present example consists of, in order from the object side, a meniscus convex lens G1 concave on the image side, a cemented lens obtained by cementing a biconcave lens G2, a meniscus convex lens G3 concave on the image side, and a meniscus concave lens G4 convex on the object side, and a biconvex lens G5. In the present example, the first lens element is the meniscus convex lens G1, the second lens element is the biconvex lens G5, and the negative lens disposed closest to the object side is the biconcave lens G2. By attaching the reduction optical system according to the present example to the main optical system, an image circle having a diameter that is obtained by multiplying the diameter of the image circle of the main optical system 0.710 times is obtained. Lenses G1, G3, and G5 are positive refractive power lenses. Lenses G2 and G4 are negative refractive power lenses.

Table 1 illustrates values related to the conditional expressions (1) to (7) according to the present example. The present example can provide a reduction optical system that satisfies all of the conditional expressions (1) to (7) and is advantageous in terms of small size, sufficient back focus, and high optical performance. It is sufficient for the reduction optical system according to the present example to have a configuration according to claim 1 described below, and the conditional expressions (1) to (7) may not be necessarily satisfied. In a case where at least one of the conditional expressions (1) to (7) is satisfied, it is possible to exert more remarkable effects as compared with a case where no conditional expression is satisfied.

Example 7

Figure 13:
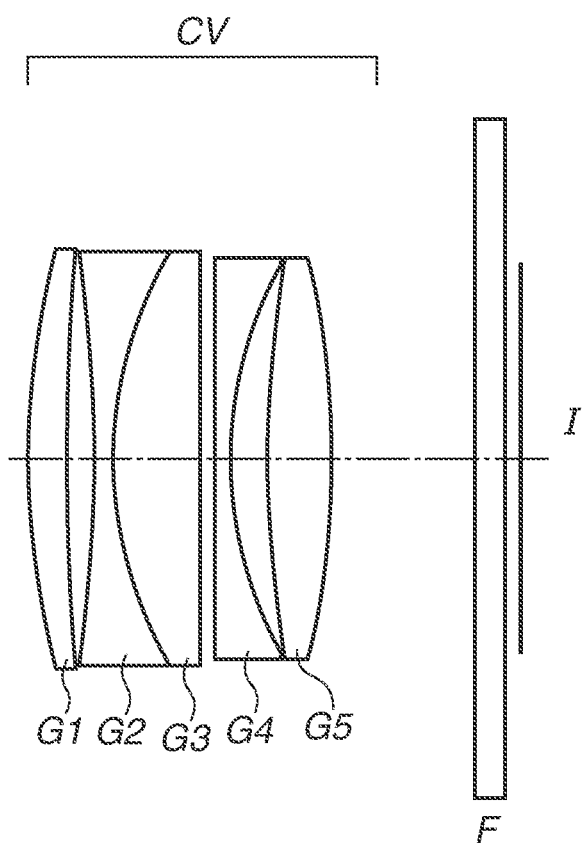
FIG. 13 is a cross-sectional view of a reduction optical system according to Example 7.
Figure 14:
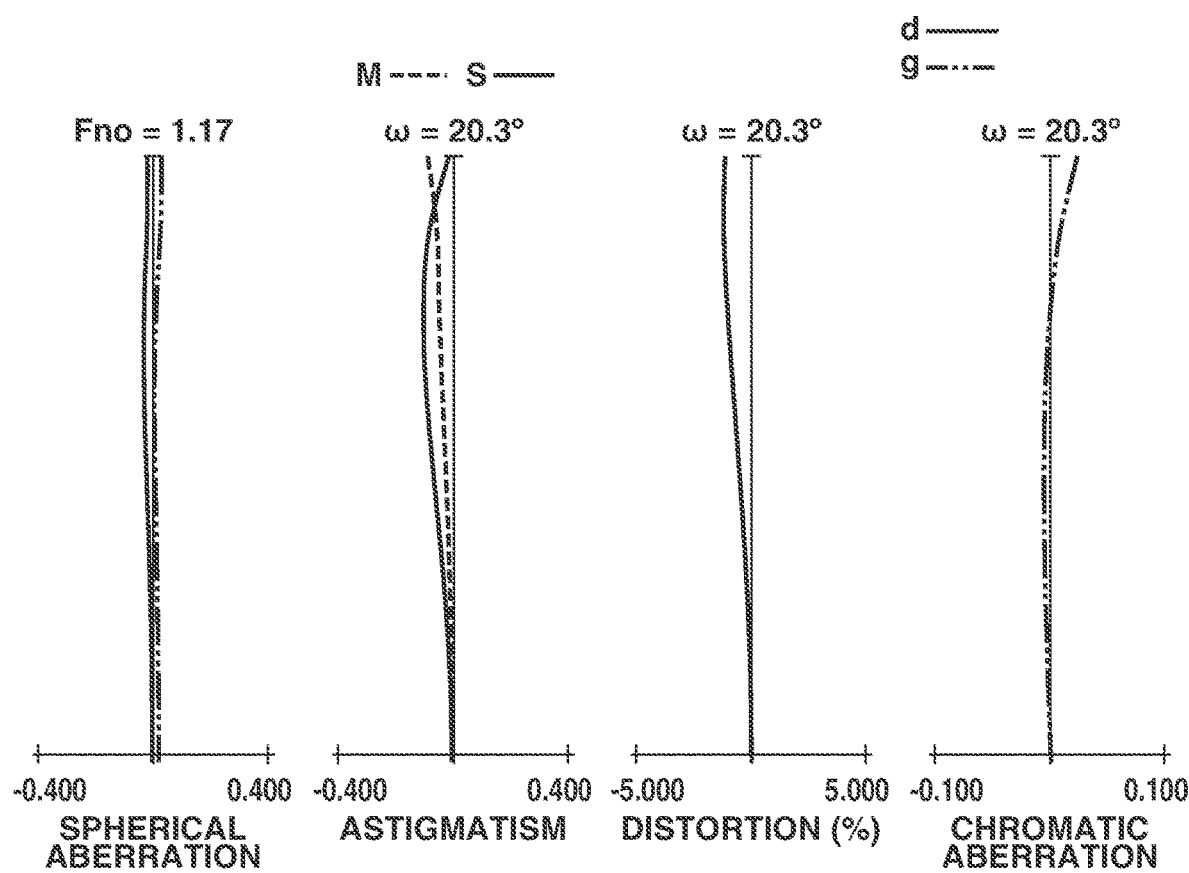
FIG. 14 is a diagram illustrating longitudinal aberrations of an optical system in which the reduction optical system according to Example 7 is attached to the main optical system focusing on infinity.

FIG. 13 is a cross-sectional view of a reduction optical system according to Example 7 (corresponding to Numerical Example 7). FIG. 14 is a diagram illustrating longitudinal aberrations of an optical system in which the reduction optical system according to Example 7 is attached to the main optical system focusing on infinity. The surface closest to the object side of the reduction optical system according to the present example is disposed at a position separated toward the image side by 2.000 mm from a 16th surface that is the surface closest to the image side of the main optical system. The reduction optical system according to the present example consists of, in order from the object side, a meniscus convex lens G1 concave on the image side, a cemented lens obtained by cementing a biconcave lens G2 and a biconvex lens G3, a biconcave lens G4, and a biconvex lens G5. In the present example, the first lens element is the meniscus convex lens G1, the second lens element is the biconvex lens G5, and the negative lens disposed closest to the object side is the biconcave lens G2. By attaching the reduction optical system according to the present example to the main optical system, an image circle having a diameter that is obtained by multiplying the diameter of the image circle of the main optical system 0.783 times is obtained. Lenses G1, G3, and G5 are positive refractive power lenses. Lenses G2 and G4 are negative refractive power lenses.

Table 1 illustrates values related to the conditional expressions (1) to (7) according to the present example. The present example can provide a reduction optical system that satisfies all of the conditional expressions (1) to (7) and is advantageous in terms of small size, sufficient back focus, and high optical performance. It is sufficient for the reduction optical system according to the present example to have a configuration according to claim 1 described below, and the conditional expressions (1) to (7) may not be necessarily satisfied. In a case where at least one of the conditional expressions (1) to (7) is satisfied, it is possible to exert more remarkable effects as compared with a case where no conditional expression is satisfied.

NUMERICAL EXAMPLES

<Main Optical System>

| Unit mm | | | | | |
|---|---|---|---|---|---|
| Surface Data | | | | | |
| Surface Number | r | d | nd | vd | Effective Diameter |
| 1 | 80.741 | 3.92 | 1.77250 | 49.6 | 35.49 |
| 2 | −851.470 | 0.15 | | | 35.15 |
| 3 | 28.940 | 6.73 | 1.83481 | 42.7 | 33.03 |
| 4 | 53.453 | 1.56 | | | 30.04 |
| 5 | 81.904 | 3.28 | 1.72047 | 34.7 | 29.30 |
| 6 | 18.258 | 7.54 | | | 24.49 |
| 7 (diaphragm) | ∞ | 5.08 | | | 24.36 |
| 8 | −27.317 | 1.39 | 1.73800 | 32.3 | 24.25 |
| 9 | 29.595 | 8.79 | 1.88100 | 40.1 | 27.13 |
| 10 | −31.996 | 2.12 | | | 27.74 |
| 11 | −21.263 | 2.52 | 1.72047 | 34.7 | 27.68 |
| 12 | −82.521 | 0.15 | | | 30.73 |
| 13 | 723.827 | 7.10 | 1.59522 | 67.7 | 31.74 |
| 14 | −28.930 | 0.15 | | | 32.40 |
| 15* | 625.332 | 4.12 | 1.77250 | 49.5 | 31.05 |
| 16 | −56.842 | 39.81 | | | 30.80 |
| Image Plane | ∞ | | | | |

| Aspherical Surface Data |
|---|
| 15th Surface |
| K = 0.00000e+000 A4 = −2.77448e−006 A6 = −3.60131e−010 A8 = −1.23803e−011 A10 = 4.76619e−014 A12 = −6.88926e−017 |

| Various Kinds of Data | |
|---|---|
| Focal Length | 51.46 |
| F-number | 1.45 |
| Half Field Angle | 22.80 |
| Image Height | 21.64 |
| Total Lens Length | 94.41 |
| BF | 39.81 |
| Position of Entrance Pupil | 27.09 |
| Position of Exit Pupil | −56.91 |
| Position of Front Principle Point | 51.17 |
| Position of Rear Principle Point | −11.65 |

Numerical Example 1

Unit mm

Surface Data

| Surface Number | r | d | nd | vd | Effective Diameter |
|---|---|---|---|---|---|
| 17 | 50.909 | 3.53 | 2.00100 | 29.1 | 31.73 |
| 18 | 206.169 | 1.96 | | | 31.42 |
| 19 | −106.066 | 1.20 | 1.62004 | 36.3 | 31.38 |
| 20 | 26.641 | 7.00 | 2.00100 | 29.1 | 31.20 |
| 21 | 172.336 | 0.17 | | | 30.45 |
| 22 | 94.213 | 1.15 | 1.94594 | 18.0 | 30.18 |
| 23 | 25.510 | 3.53 | | | 28.62 |
| 24 | 80.745 | 4.59 | 1.69680 | 55.5 | 28.91 |
| 25 | −63.832 | 7.08 | | | 29.24 |
| 26 | ∞ | 2.50 | 1.54430 | 69.9 | 50.00 |
| 27 | ∞ | 2.00 | | | 50.00 |
| Image Plane | ∞ | | | | |

Various Kinds of Data

| | |
|---|---|
| Focal Length | 36.54 |
| F-number | 1.03 |
| Half Field Angle | 22.05 |
| Image Height | 14.80 |
| Total Lens Length | 91.95 |
| BF | 2.00 |
| Position of Entrance Pupil | 27.09 |
| Position of Exit Pupil | −276.12 |
| Position of Front Principle Point | 58.82 |
| Position of Rear Principle Point | −34.54 |

Numerical Example 2

Unit mm

Surface Data

| Surface Number | r | d | nd | vd | Effective Diameter |
|---|---|---|---|---|---|
| 17 | 47.832 | 4.27 | 1.95375 | 32.3 | 31.67 |
| 18 | 1940.867 | 1.20 | | | 31.34 |
| 19 | −118.503 | 1.00 | 1.74951 | 35.3 | 31.30 |
| 20 | 21.634 | 8.19 | 1.95375 | 32.3 | 30.48 |
| 21 | 100.856 | 1.00 | 1.89286 | 20.4 | 29.63 |
| 22 | 25.910 | 3.42 | | | 28.46 |
| 23 | 80.683 | 4.62 | 1.72916 | 54.7 | 28.81 |
| 24 | −55.811 | 7.00 | | | 29.15 |
| 25 | ∞ | 2.50 | 1.51633 | 64.1 | 50.00 |
| 26 | ∞ | 2.04 | | | 50.00 |
| Image Plane | ∞ | | | | |

Various Kinds of Data

| | |
|---|---|
| Focal Length | 36.54 |
| F-number | 1.03 |
| Half Field Angle | 22.05 |
| Image Height | 14.80 |
| Total Lens Length | 92.47 |
| BF | 10.69 |
| Position of Entrance Pupil | 27.09 |
| Position of Exit Pupil | −288.00 |
| Position of Front Principle Point | 59.02 |
| Position of Rear Principle Point | −34.50 |

Numerical Example 3

Unit mm

Surface Data

| Surface Number | r | d | nd | vd | Effective Diameter |
|---|---|---|---|---|---|
| 17 | 46.285 | 3.75 | 2.00100 | 29.1 | 32.91 |
| 18 | 168.332 | 1.34 | | | 32.44 |
| 19 | −365.708 | 1.20 | 1.70154 | 41.2 | 32.36 |
| 20 | 27.525 | 5.46 | 1.91650 | 31.6 | 31.05 |
| 21 | 87.039 | 0.18 | | | 30.40 |
| 22 | 59.557 | 1.15 | 1.94594 | 18.0 | 30.16 |
| 23 | 27.818 | 3.83 | | | 28.84 |
| 24 | 176.644 | 1.20 | 1.85478 | 24.8 | 28.97 |
| 25 | 67.243 | 5.89 | 1.69680 | 55.5 | 29.21 |
| 26 | −77.318 | 8.00 | | | 29.65 |
| 27 | ∞ | 2.50 | 1.51633 | 64.1 | 50.00 |
| 28 | ∞ | 2.16 | | | 50.00 |
| Image Plane | ∞ | | | | |

Various Kinds of Data

| | |
|---|---|
| Focal Length | 40.14 |
| F-number | 1.13 |
| Half Field Angle | 20.24 |
| Image Height | 14.80 |
| Total Lens Length | 93.90 |
| BF | 11.81 |
| Position of Entrance Pupil | 27.09 |
| Position of Exit Pupil | −122.63 |
| Position of Front Principle Point | 54.31 |
| Position of Rear Principle Point | −37.98 |

Numerical Example 4

Unit mm

Surface Data

| Surface Number | r | d | nd | vd | Effective Diameter |
|---|---|---|---|---|---|
| 17 | 62.121 | 3.51 | 1.90043 | 37.4 | 31.27 |
| 18 | −4465.572 | 2.00 | | | 31.16 |
| 19 | −66.735 | 0.90 | 1.59270 | 35.3 | 31.13 |
| 20 | 24.721 | 8.32 | 2.05090 | 26.9 | 31.87 |
| 21 | −7017.427 | 0.32 | | | 31.14 |
| 22 | −793.922 | 0.90 | 1.94594 | 18.0 | 31.02 |
| 23 | 26.876 | 2.90 | | | 29.42 |
| 24 | 62.445 | 5.25 | 1.88300 | 40.8 | 29.66 |
| 25 | −58.236 | 6.00 | | | 29.88 |
| 26 | ∞ | 2.50 | 1.51633 | 64.1 | 50.00 |
| 27 | ∞ | (variable) | | | 50.00 |
| Image Plane | ∞ | | | | |

Various Kinds of Data

| | |
|---|---|
| Focal Length | 33.45 |
| F-number | 0.94 |
| Half Field Angle | 22.42 |
| Image Height | 13.80 |
| Total Lens Length | 91.91 |
| BF | 9.73 |
| Position of Entrance Pupil | 27.09 |
| Position of Exit Pupil | 275.35 |
| Position of Front Principle Point | 64.63 |
| Position of Rear Principle Point | −31.37 |

Numerical Example 5

Unit mm

Surface Data

| Surface Number | r | d | nd | vd | Effective Diameter |
|---|---|---|---|---|---|
| 17 | 63.198 | 1.00 | 1.48749 | 70.2 | 31.42 |
| 18 | 43.080 | 4.44 | 2.00100 | 29.1 | 31.22 |
| 19 | 253.678 | 1.53 | | | 30.84 |
| 20 | −138.197 | 1.00 | 1.69895 | 30.1 | 30.79 |
| 21 | 26.572 | 6.08 | 2.00100 | 29.1 | 30.40 |
| 22 | 104.760 | 0.24 | | | 29.81 |
| 23 | 70.696 | 1.00 | 1.94594 | 18.0 | 29.65 |
| 24 | 28.124 | 3.58 | | | 28.58 |
| 25 | 140.240 | 4.71 | 1.76385 | 48.5 | 28.81 |
| 26 | −46.751 | 1.00 | 1.85478 | 24.8 | 29.14 |
| 27 | −63.583 | 7.00 | | | 29.49 |
| 28 | ∞ | 2.50 | 1.51633 | 64.1 | 50.00 |
| 29 | ∞ | 2.10 | | | 50.00 |
| Image Plane | ∞ | | | | |

Various Kinds of Data

| | |
|---|---|
| Focal Length | 37.57 |
| F-number | 1.06 |
| Half Field Angle | 21.50 |
| Image Height | 14.80 |
| Total Lens Length | 93.41 |
| BF | 10.75 |
| Position of Entrance Pupil | 27.09 |
| Position of Exit Pupil | −227.93 |
| Position of Front Principle Point | 58.52 |
| Position of Rear Principle Point | −35.47 |

Numerical Example 6

Unit mm

Surface Data

| Surface Number | r | d | nd | vd | Effective Diameter |
|---|---|---|---|---|---|
| 17 | 57.454 | 3.46 | 1.90525 | 35.0 | 31.76 |
| 18 | 801.829 | 2.62 | | | 31.58 |
| 19 | −80.235 | 1.00 | 1.59270 | 35.3 | 31.39 |
| 20 | 25.297 | 6.78 | 2.05090 | 26.9 | 31.54 |
| 21 | 130.809 | 1.00 | 1.92286 | 18.9 | 30.83 |
| 22 | 26.170 | 3.64 | | | 29.31 |
| 23 | 84.911 | 4.86 | 1.72916 | 54.7 | 29.63 |
| 24 | −54.246 | 7.00 | | | 29.96 |
| 25 | ∞ | 2.50 | 1.51633 | 64.1 | 50.00 |
| 26 | ∞ | 2.09 | | | 50.00 |
| Image Plane | ∞ | | | | |

Various Kinds of Data

| | |
|---|---|
| Focal Length | 36.54 |
| F-number | 1.03 |
| Half Field Angle | 22.05 |
| Image Height | 14.80 |
| Total Lens Length | 92.19 |
| BF | 10.74 |
| Position of Entrance Pupil | 27.09 |
| Position of Exit Pupil | −482.65 |
| Position of Front Principle Point | 60.87 |
| Position of Rear Principle Point | −34.45 |

Numerical Example 7

Unit mm

Surface Data

| Surface Number | r | d | nd | vd | Effective Diameter |
|---|---|---|---|---|---|
| 17 | 58.301 | 2.83 | 1.88300 | 40.8 | 30.01 |
| 18 | 165.148 | 2.10 | | | 29.62 |
| 19 | −119.174 | 1.45 | 1.51633 | 64.1 | 29.58 |
| 20 | 30.119 | 6.71 | 1.90043 | 37.4 | 29.75 |
| 21 | −1223.055 | 0.92 | | | 29.20 |
| 22 | −5261.247 | 1.15 | 1.85896 | 22.7 | 28.79 |
| 23 | 29.490 | 2.77 | | | 27.78 |
| 24 | 84.265 | 4.75 | 1.61772 | 49.8 | 28.05 |
| 25 | −70.633 | 10.59 | | | 28.48 |
| 26 | ∞ | 2.50 | 1.54430 | 69.9 | 50.00 |
| 27 | ∞ | 1.00 | | | 50.00 |
| Image Plane | ∞ | | | | |

Various Kinds of Data

| | |
|---|---|
| Focal Length | 40.10 |
| F-number | 1.17 |
| Half Field Angle | 20.26 |
| Image Height | 14.80 |
| Total Lens Length | 93.36 |
| BF | 13.20 |
| Position of Entrance Pupil | 27.09 |
| Position of Exit Pupil | −134.05 |
| Position of Front Principle Point | 55.28 |
| Position of Rear Principle Point | −39.1 |

TABLE 1

| | | Numerical Example 1 | Numerical Example 2 | Numerical Example 3 | Numerical Example 4 |
|---|---|---|---|---|---|
| Conditional Expression (1) | fp1/f | 0.802 | 0.622 | 0.440 | 1.245 |
| Conditional Expression (2) | fp1/fp2 | 1.288 | 1.119 | 0.716 | 1.954 |
| Conditional Expression (3) | Nph | 2.001 | 1.954 | 2.001 | 1.900 |
| | | 2.001 | 1.954 | 1.917 | 2.051 |
| Conditional Expression (4) | fph/f | 0.802 | 0.622 | 0.440 | 1.245 |
| | | 0.369 | 0.333 | 0.295 | 0.429 |
| Conditional Expression (5) | fn/f | −0.411 | −0.295 | −0.255 | −0.554 |
| Conditional Expression (6) | f/r1 | −0.785 | −0.697 | −0.390 | −0.820 |
| Conditional Expression (7) | β | 0.710 | 0.710 | 0.780 | 0.650 |
| | f | 83.272 | 82.551 | 142.774 | 54.691 |
| | fp1 | 66.774 | 51.362 | 62.809 | 68.068 |
| | fp2 | 51.838 | 45.900 | 87.698 | 34.837 |
| | Nph | 2.001 | 1.954 | 2.001 | 1.900 |
| | | 2.001 | 1.954 | 1.917 | 2.051 |
| | fph | 66.774 | 51.362 | 62.809 | 68.068 |
| | | 30.742 | 27.491 | 42.078 | 23.455 |
| | fn | −34.223 | −24.334 | −36.444 | −30.324 |
| | r1 | −106.066 | −118.503 | −365.708 | −66.735 |

| | | Numerical Example 5 | Numerical Example 6 | Numerical Example 7 |
|---|---|---|---|---|
| Conditional Expression (1) | fp1/f | 0.695 | 0.893 | 0.756 |
| Conditional Expression (2) | fp1/fp2 | 1.059 | 1.481 | 1.602 |
| Conditional Expression (3) | Nph | 2.001 | 1.905 | 1.900 |
| | | 2.001 | 2.051 | |
| Conditional Expression (4) | fph/f | 0.564 | 0.893 | 0.245 |
| | | 0.376 | 0.378 | |
| Conditional Expression (5) | fn/f | — | −0.424 | −0.348 |

TABLE 1-continued

| | | | | |
|---|---|---|---|---|
| Conditional Expression (6) | f/r1 | — | −0.952 | −1.119 |
| Conditional Expression (7) | B | 0.730 | 0.710 | 0.783 |
| | F | 90.998 | 76.353 | 133.341 |
| | fp1 | 63.221 | 68.215 | 100.803 |
| | fp2 | 59.692 | 46.074 | 62.941 |
| | Nph | 2.001 | 1.905 | 1.900 |
| | | 2.001 | 2.051 | |
| | Fph | 51.300 | 68.215 | 32.729 |
| | | 34.235 | 28.892 | |
| | Fn | — | −32.336 | −46.412 |
| | r1 | — | −80.235 | −119.174 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-071688, filed Apr. 13, 2020, which is hereby incorporated by reference herein in its entirety.

What is claimed is:

1. A reduction optical system disposed on an image side of a main optical system, a composite focal length of the main optical system and the reduction optical system being shorter than a focal length of the main optical system, the reduction optical system comprising:
    a first lens element disposed closest to an object side and having a positive refractive power;
    a second lens element disposed closest to an image side and having a positive refractive power; and
    a positive lens and a negative lens disposed between the first lens element and the second lens element,
    wherein following conditional expressions are satisfied:

$0.440 \leq fp1/f < 1.500$, and $0.600 < fp1/fp2 < 2.500$, where fp1 is a focal length of the first lens element, f is a focal length of the reduction optical system, and fp2 is a focal length of the second lens element.

2. The reduction optical system according to claim 1, wherein the reduction optical system includes a first positive lens which satisfies following conditional expressions:

$1.895 < Nph$, and $0.200 < fph/f < 1.500$, where Nph is a refractive index of the first positive lens, and fph is a focal length of the first positive lens.

3. The reduction optical system according to claim 1, wherein the first lens element is a single lens, and a following conditional expression is satisfied:

$-0.700 < fn/f < -0.100$, where fn is a focal length of a negative lens, included in the reduction optical system, disposed closest to the object side.

4. The reduction optical system according to claim 3, wherein a following conditional expression is satisfied:

$-1.500 < f/r1 < -0.200$, where r1 is a radius of curvature of a surface on an object side of the negative lens disposed closest to the object side.

5. The reduction optical system according to claim 1, wherein a lens disposed closest to the image side included in the second lens element is a positive lens.

6. The reduction optical system according to claim 1, wherein a following conditional expression is satisfied:

$0.500 < \beta < 0.900$, where β is a lateral magnification of the reduction optical system disposed on the image side of the main optical system.

7. An image pickup apparatus comprising:
    a reduction optical system disposed on an image side of a main optical system, a composite focal length of the main optical system and the reduction optical system being shorter than a focal length of the main optical system; and
    an image pickup element configured to pick up an image formed via the reduction optical system,
    wherein the reduction optical system comprises:
    a first lens element disposed closest to an object side and having a positive refractive power;
    a second lens element disposed closest to an image side and having a positive refractive power; and
    a positive lens and a negative lens disposed between the first lens element and the second lens element, and
    wherein following conditional expressions are satisfied:

$0.440 \leq fp1/f < 1.500$, and $0.600 < fp1/fp2 < 2.500$, where fp1 is a focal length of the first lens element, f is a focal length of the reduction optical system, and fp2 is a focal length of the second lens element.

8. A reduction optical system disposed on an image side of a main optical system, a composite focal length of the main optical system and the reduction optical system being shorter than a focal length of the main optical system, the reduction optical system comprising:
    a first lens element disposed closest to an object side and having a positive refractive power;
    a second lens element disposed closest to an image side and having a positive refractive power; and
    a positive lens and a negative lens disposed between the first lens element and the second lens element,
    wherein following conditional expression is satisfied:

$0.440 \leq fp1/f < 1.500$, where fp1 is a focal length of the first lens element, and f is a focal length of the reduction optical system, and
    wherein the reduction optical system includes a first positive lens which satisfies following conditional expressions:

$1.900 \leq Nph$ where Nph is a refractive index of the first positive lens.

9. The reduction optical system according to claim 8, wherein a following conditional expression is satisfied:

$0.500 < fp1/fp2 < 2.500$, where fp2 is a focal length of the second lens element.

10. The reduction optical system according to claim 8, wherein a following conditional expression is satisfied:

$0.200 < fph/f < 1.500$, where fph is a focal length of the first positive lens.

11. The reduction optical system according to claim 8, wherein the first lens element is a single lens, and a following conditional expression is satisfied:

$$-0.700 < fn/f < -0.100,$$

where fn is a focal length of a negative lens, included in the reduction optical system, disposed closest to the object side.

12. The reduction optical system according to claim 11, wherein a following conditional expression is satisfied:

$$-1.500 < f/r1 < -0.200,$$

where r1 is a radius of curvature of a surface on an object side of the negative lens disposed closest to the object side.

13. The reduction optical system according to claim 8, wherein a lens disposed closest to the image side included in the second lens element is a positive lens.

14. The reduction optical system according to claim 8, wherein a following conditional expression is satisfied:

$$0.500 < \beta < 0.900,$$

where $\beta$ is a lateral magnification of the reduction optical system disposed on the image side of the main optical system.

* * * * *